United States Patent
Chu et al.

(10) Patent No.: US 10,596,452 B2
(45) Date of Patent: Mar. 24, 2020

(54) TOY INTERACTIVE METHOD AND DEVICE

(71) Applicant: Shenzhen Sigma Microelectronics Co., Ltd, Shenzhen (CN)

(72) Inventors: Zhenquan Chu, Shenzhen (CN); Zhiqian Li, Shenzhen (CN)

(73) Assignee: Shenzhen Sigma Microelectronics Co., Ltd., Shenzhen (CN)

( * ) Notice: Subject to any disclaimer, the term of this patent is extended or adjusted under 35 U.S.C. 154(b) by 126 days.

(21) Appl. No.: 15/828,011

(22) Filed: Nov. 30, 2017

(65) Prior Publication Data

US 2019/0099666 A1 Apr. 4, 2019

(30) Foreign Application Priority Data

Sep. 29, 2017 (CN) .......................... 2017 1 0909597

(51) Int. Cl.
| | |
|---|---|
| *A63F 9/00* | (2006.01) |
| *A63F 13/235* | (2014.01) |
| *A63H 30/04* | (2006.01) |
| *A63F 13/424* | (2014.01) |
| *A63F 9/24* | (2006.01) |

(52) U.S. Cl.
CPC .......... *A63F 13/235* (2014.09); *A63F 13/424* (2014.09); *A63H 30/04* (2013.01); *A63F 2009/245* (2013.01); *A63F 2009/2433* (2013.01); *A63F 2300/1081* (2013.01); *A63F 2300/6072* (2013.01); *A63H 2200/00* (2013.01)

(58) Field of Classification Search
None
See application file for complete search history.

(56) References Cited

U.S. PATENT DOCUMENTS

| | | | | |
|---|---|---|---|---|
| 6,368,177 | B1 * | 4/2002 | Gabai | A63F 13/12 446/404 |
| 6,631,351 | B1 * | 10/2003 | Ramachandran | G10L 13/00 704/10 |
| 6,663,393 | B1 * | 12/2003 | Ghaly | A63H 3/28 434/262 |
| 6,773,344 | B1 * | 8/2004 | Gabai | A63H 3/28 463/1 |
| 6,937,289 | B1 * | 8/2005 | Ranta | H04N 7/085 348/460 |

(Continued)

*Primary Examiner* — Seng H Lim
(74) *Attorney, Agent, or Firm* — McAndrews, Held & Malloy, Ltd.

(57) ABSTRACT

Disclosed is a toy interactive method and device. The method comprises: a medium sample is collected and reference sample information of the medium sample is generated; a playing content of a medium being played is collected; characteristic information of the collected playing content is extracted; the extracted characteristic information is matched with the reference sample information to obtain a matching result; according to the obtained matching result, a to-be-played content that is to be played after a predetermined time period in the medium being played is predicted; and according to the predicted to-be-played content, a toy is driven to synchronously execute an interactive content corresponding to the to-be-played content at a corresponding time point after the predetermined time period. Through the toy interactive method and device, the technical problem is solved.

20 Claims, 8 Drawing Sheets

(56) References Cited

U.S. PATENT DOCUMENTS

| | | | | |
|---|---|---|---|---|
| 8,795,022 | B2* | 8/2014 | Lipman | A63H 3/28 446/175 |
| 8,827,761 | B2* | 9/2014 | Lipman | A63H 3/28 446/175 |
| 9,223,902 | B1* | 12/2015 | McHugh | G06F 16/9032 |
| 2002/0029388 | A1* | 3/2002 | Heisele | A63H 3/28 725/74 |
| 2002/0138175 | A1* | 9/2002 | Fujita | G06N 3/008 700/245 |
| 2003/0130851 | A1* | 7/2003 | Nakakita | A63H 3/28 704/275 |
| 2004/0082255 | A1* | 4/2004 | Fong | A63H 3/28 446/75 |
| 2004/0229696 | A1* | 11/2004 | Beck | A63F 13/02 463/40 |
| 2007/0128979 | A1* | 6/2007 | Shackelford | A63H 3/001 446/484 |
| 2009/0117816 | A1* | 5/2009 | Nakamura | A63H 3/28 446/175 |
| 2013/0130587 | A1* | 5/2013 | Cohen | A63H 30/04 446/175 |
| 2014/0030955 | A1* | 1/2014 | Smetanin | A63H 3/36 446/268 |
| 2015/0111465 | A1* | 4/2015 | Lipman | A63H 3/28 446/484 |
| 2015/0140893 | A1* | 5/2015 | Lipman | A63H 3/28 446/175 |

* cited by examiner

TOY INTERACTIVE METHOD AND DEVICE

CROSS-REFERENCE TO RELATED APPLICATIONS/INCORPORATION BY REFERENCE

This application claims priority to Chinese Patent Application No. 201710909597.5, filed Sep. 29, 2017, entitled "TOY INTERACTIVE METHOD AND DEVICE". The above-identified application is hereby incorporated herein by reference in its entirety.

TECHNICAL FIELD

The present disclosure relates to the field of intelligent devices, and more particularly, to a toy interactive method and device.

BACKGROUND

Nowadays, there are more and more playing modes to play a medium content. For example, the medium content may be played by a television and may be played by various intelligent devices, etc. However, at present, when the medium content is played, a spectator merely can watch or listen to the played medium content passively. He/she cannot have a personal feeling to some relatively interesting scenes or pictures, cannot personally experience an interesting feeling in a real scene, and let alone implement a timely interactive experience with the played medium content. Therefore, for a receiver, the reality sense to the played medium content is not strong such that the timely interactive experience cannot be implemented.

For the above problem, an effective solution has not been proposed yet at present.

SUMMARY

The embodiments of the present disclosure provide a toy interactive method and device, so as to at least solve the technical problem that the reality sense to the played medium content is not strong such that the timely interactive experience cannot be implemented in the related art.

According to one aspect of the embodiments of the present disclosure, a toy interactive method is provided, including: collecting a medium sample and generating reference sample information of the medium sample; collecting a playing content of a medium being played; extracting characteristic information of the collected playing content; matching the extracted characteristic information with the reference sample information to obtain a matching result; predicting, according to the obtained matching result, a to-be-played content that is to be played after a predetermined time period in the medium being played; and driving, according to the predicted to-be-played content, a toy at a corresponding time point after the predetermined time period to synchronously execute an interactive content corresponding to the to-be-played content In an example embodiment of the present disclosure, collecting the medium sample and generating the reference sample information of the medium sample includes: collecting the medium sample matched to the toy before the toy leaves a factory, generating the reference sample information of the medium sample and storing the generated reference sample information to the toy before the toy leaves the factory; and/or in an interaction performed with the playing medium via the toy, before a step of collecting the playing content of the medium being played, collecting the medium sample and generating the reference sample information of the medium sample.

In an example embodiment of the present disclosure, predicting, according to the obtained matching result, the to-be-played content that is to be played after the predetermined time period in the medium being played includes: in a condition in which the obtained matching result is that the characteristic information is matched with the reference sample information, determining a characteristic playing content included in the medium, wherein the characteristic playing content is a playing content predetermined for interaction; the characteristic playing content includes one of followings: a playing content specified in the medium sample matched with the toy, a default playing content corresponding to a predetermined time point in the medium sample, and a playing content specified by means of receiving an instruction input by a toy user in the medium sample that is collected in an interaction performed with the playing medium via the toy; and determining the characteristic playing content as the to-be-played content that is to be played after the predetermined time period.

In an example embodiment of the present disclosure, collecting the medium sample, and/or collecting the playing content of the medium being played includes: collecting the medium sample and/or the playing content of the medium being played in a manner of voice recording or image recording on the medium sample.

In an example embodiment of the present disclosure, driving, according to the predicted to-be-played content, the toy at the corresponding time point after the predetermined time period to synchronously execute the interactive content corresponding to the to-be-played content includes at least one of followings: in a condition in which a scene corresponding to the predicted to-be-played content includes an obvious illumination change effect, driving a lamp of the toy at the corresponding time point after the predetermined time period to generate an illumination change occurred in the scene, thereby rendering a real scene of the to-be-played content; in a condition in which a scene corresponding to the predicted to-be-played content includes a voice having an obvious voice characteristic, driving a loudspeaker of the toy at the corresponding time point after the predetermined time period to play the voice occurred in the scene, thereby simulating a voice atmosphere of the to-be-played content; and in a condition in which a scene corresponding to the predicted to-be-played content includes a characteristic action, driving a motor of the toy at the corresponding time point after the predetermined time period to display the characteristic action occurred in the scene, thereby providing a toy user to simulate or implementing an interaction with a toy user.

In an example embodiment of the present disclosure, driving, according to the predicted to-be-played content, the toy at the corresponding time point after the predetermined time period to synchronously execute the interactive content corresponding to the to-be-played content includes: driving the toy at the corresponding time point after the predetermined time period to synchronously execute an interactive content same as the to-be-played content, wherein the interactive content same as the to-be-played content includes: an interactive content completely or partially same as the to-be-played content; and/or driving the toy at the corresponding time point after the predetermined time period to synchronously execute an interactive content for responding the to-be-played content, wherein the interactive content for responding the to-be-played content includes at least one of followings: a response action for answering a question proposed in the to-be-played content, a response action for asking a question corresponding to an answer included in the to-be-played content and a response action for responding an action included in the to-be-played content.

In an example embodiment of the present disclosure, in a condition in which the collected medium sample or the playing content is a voice, the characteristic information or the reference sample information includes at least one of followings: frequency information of the voice; time sequence information of the voice; tone information of the voice; accent information of the voice; and type information of a medium included in the voice.

In an example embodiment of the present disclosure, in a condition in which the collected medium sample or the playing content is an image, the characteristic information or the reference sample information includes at least one of followings: color information of the image; picture information of the image; definition information of the image; brightness information of the image; and pixel information of the image.

According to another aspect of the present disclosure, a toy interactive device is provided, including: a first collecting component, configured to collect a medium sample and generate reference sample information of the medium sample; a second collecting component, configured to collect a playing content of a medium being played; an extracting component, configured to extract characteristic information of the collected playing content; a matching component, configured to match the extracted characteristic information with the reference sample information to obtain a matching result; a predicting component, configured to predict, according to the obtained matching result, a to-be-played content that is to be played after a predetermined time period in the medium being played; and a driving component, configured to drive, according to the predicted to-be-played content, a toy at a corresponding time point after the predetermined time period to synchronously execute an interactive content corresponding to the to-be-played content.

In an example embodiment of the present disclosure, the first collecting component includes: a first collecting element, configured to collect the medium sample matched to the toy before the toy leaves a factory, generate the reference sample information of the medium sample and store the generated reference sample information to the toy before the toy leaves the factory; and/or a second collecting element, configured to collect the medium sample and generate the reference sample information of the medium sample before a step of collecting the playing content of the medium being played in an interaction performed with the playing medium via the toy.

In an example embodiment of the present disclosure, the predicting component includes: a first determining element, configured to determine a characteristic playing content included in the medium in a condition in which the obtained matching result is that the characteristic information is matched with the reference sample information, wherein the characteristic playing content is a playing content predetermined for interaction; the characteristic playing content includes one of followings: a playing content specified in the medium sample matched with the toy, a default playing content corresponding to a predetermined time point in the medium sample, and a playing content specified by means of receiving an instruction input by a toy user in the medium sample that is collected in an interaction performed with the playing medium via the toy; and a second determining element, configured to determine the characteristic playing content as the to-be-played content that is to be played after the predetermined time period.

In an example embodiment of the present disclosure, the first collecting component is further configured to collect the medium sample in a manner of voice recording or image recording on the medium sample; and/or the second collecting component is further configured to collect the playing content of the medium being played in a manner of voice recording or image recording on the medium sample.

In an example embodiment of the present disclosure, the driving component includes at least one of followings: a first driving element, configured in a condition in which a scene corresponding to the predicted to-be-played content includes an obvious illumination change effect, to drive a lamp of the toy at the corresponding time point after the predetermined time period to generate an illumination change occurred in the scene, thereby rendering a real scene of the to-be-played content; a second driving element, configured in a condition in which a scene corresponding to the predicted to-be-played content includes a voice having an obvious voice characteristic, to drive a loudspeaker of the toy at the corresponding time point after the predetermined time period to play the voice occurred in the scene, thereby simulating a voice atmosphere of the to-be-played content; and a third driving element, configured in a condition in which a scene corresponding to the predicted to-be-played content includes a characteristic action, to drive a motor of the toy at the corresponding time point after the predetermined time period to display the characteristic action occurred in the scene, thereby providing a toy user to simulate or implementing an interaction with a toy user.

In an example embodiment of the present disclosure, the driving component includes: a fourth driving element, configured to drive the toy at the corresponding time point after the predetermined time period to synchronously execute an interactive content same as the to-be-played content, wherein the interactive content same as the to-be-played content includes: an interactive content completely or partially same as the to-be-played content; and/or a fifth driving element, configured to drive the toy at the corresponding time point after the predetermined time period to synchronously execute an interactive content for responding the to-be-played content, wherein the interactive content for responding the to-be-played content includes at least one of followings: a response action for answering a question proposed in the to-be-played content, a response action for asking a question corresponding to an answer included in the to-be-played content and a response action for responding an action included in the to-be-played content.

According to another aspect of the present disclosure, a toy is provided, including the toy interactive device mentioned above.

In the embodiments of the present disclosure, by means of predicting the to-be-played content that is to be played after the predetermined time period in the medium being played, and driving the toy at the corresponding time point after the predetermined time period to synchronous execute the interactive content corresponding to the to-be-played content, the purposes of predicting the to-be-played content that is to be played in advance and driving the toy to synchronously execute the interactive content corresponding to the to-be-played content are achieved; the technical effect that when the medium content is played, a real medium content scene is displayed to a spectator of the medium content such that the spectator can experience the timely interaction to the played medium content is achieved; and thus, the technical problem that the reality sense to the played medium content is not strong such that the timely interactive experience cannot be implemented in the related art is solved.

BRIEF DESCRIPTION OF THE DRAWINGS

The accompanying drawings are described here to provide a further understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

To make a person skilled in the art better understand the solutions of the present disclosure, the following clearly and completely describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be noted that, terminologies such as "first" and "second" in the specification, claims and accompanying drawings of the present disclosure are only used to distinguish similar objects, rather than to describe a special order or a precedence order. It should be understood that data used in such a way may be interchangeable in a certain cases, such that the embodiments of the present disclosure described here can be implemented in an order other than those illustrated or described here. As used herein, the terms "includes," "including," "includes," "including," "has," "having" or any other variation thereof are intended to cover a non-exclusive inclusion. For example, a process, method, article, or apparatus that includes a list of steps or units is not necessarily limited to only those steps or units but may include other steps or units not expressly listed or inherent to such process, method, article, or apparatus.

According to the embodiments of the present disclosure, a method embodiment of a toy interactive method is provided. It should be noted that, the steps shown in the flowchart of the accompanying drawings may be executed in such as a computer system having a group of computer executable instructions. Moreover, although a logical sequence is shown in the flowchart, and in some cases, the shown or described steps may be executed in other sequences different from here.

Figure 1:
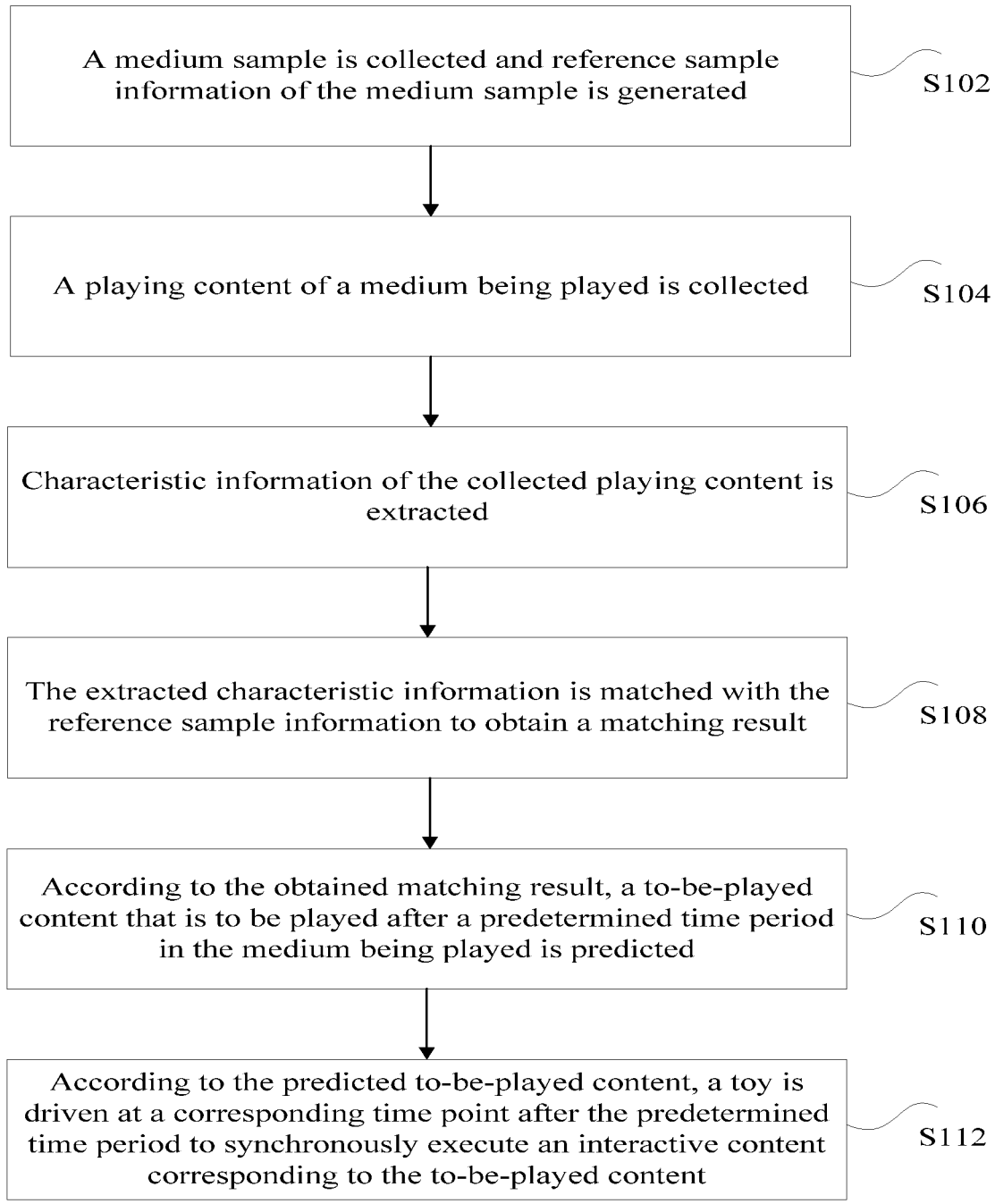
FIG. 1 is a flowchart of a toy interactive method according to an embodiment of the present disclosure.

FIG. 1 is a flowchart of a toy interactive method according to an embodiment of the present disclosure. As shown in FIG. 1, the method includes the following steps.

In step S102, a medium sample is collected and reference sample information of the medium sample is generated.

In step S104, a playing content of a medium being played is collected.

In step S106, characteristic information of the collected playing content is extracted.

In step S108, the extracted characteristic information is matched with the reference sample information to obtain a matching result.

In step S110, according to the obtained matching result, a to-be-played content that is to be played after a predetermined time period in the medium being played is predicted.

In step S112, according to the predicted to-be-played content, a toy is driven, at a corresponding time point after the predetermined time period, to synchronously execute an interactive content corresponding to the to-be-played content.

By means of the above steps, after the medium content of the medium being played is collected, the characteristic information of the medium content is extracted, then the to-be-played medium content that is to be played after the predetermined time period in the medium being played is predicted according to the characteristic information, and the toy is driven at the corresponding time point to synchronously execute the interactive content corresponding to the to-be-played content, so that the purposes of predicting the to-be-played content that is to be played in advance and driving the toy to synchronously execute the interactive content corresponding to the to-be-played content are achieved; the technical effects that when the medium content is played, a real medium content scene is displayed to a spectator of the medium content such that the spectator can experience the timely interaction to the played medium content are achieved; and thus, the technical problem that the reality sense to the played medium content is not strong such that the timely interactive experience cannot be implemented in the related art is solved. Additionally, by means of predicting in advance, the technical problem of difficult synchronization is effectively solved.

When the medium sample is collected and the reference sample information of the medium sample is generated, according to different application requirements, the medium sample may be collected at different time points, and the reference sample information of the medium sample is generated. Examples are illustrated as follows.

For example, the medium sample matched to the toy may be collected before the toy leaves a factory, the reference sample information of the medium sample is generated and the generated reference sample information is stored to the toy before the toy leaves the factory. In such a collecting way, it may be ensured that the toy user may directly use the medium sample carried by the toy once getting the toy and there is no need for the toy user to perform any operation, so the user experience is relatively high.

Also for example, in an interaction performed with the playing medium via the toy, before a step that the playing content of the medium being played is collected, the medium sample may be collected and the reference sample information of the medium sample is generated. That is, when there is a need to perform the interaction with the playing medium, before the playing content of the medium being played is collected, the medium is taken as the medium sample to collect first and then the reference sample information of the medium sample is generated. In such a collecting way, it may be ensured that when there is the need to perform the interaction with the playing medium, the medium to be interacted is collected, so that the requirements of the user on different media are effectively met and the medium to be interacted may be flexibly selected.

According to an example embodiment, when the to-be-played content that is to be played after the predetermined time period in the medium being played is predicted according to the obtained matching result, many ways may be adopted. For example, in a condition in which the obtained matching result is that the characteristic information is matched with the reference sample information, the characteristic playing content included in the medium may be determined first, wherein the characteristic playing content is a playing content predetermined for interaction. Herein, there also may be many characteristic playing contents. For instance, there may include one of the followings: a playing content specified in the medium sample matched with the toy, for example, the playing content is specified before the toy leaves the factory; a default playing content corresponding to a predetermined time point in the medium sample, that is a default playing content corresponding to a time point appointed in advance after the medium is determined, wherein the time point appointed in advance may be determined when the medium sample is collected by the user; and a playing content specified by means of receiving an instruction input by the toy user in the medium sample that is collected in the interaction performed with the playing medium via the toy, for example, as the playing medium may be directly seen while the medium sample is collected, the toy player may select a content which is interesting according to the directly seen medium and then sends the instruction to the toy to specify the playing content to be interacted. The characteristic playing content is determined as the to-be-played content that is to be played after the predetermined time period. It is to be noted that many methods may be adopted, according to different scenarios, to determine the characteristic playing content in the medium. When there is a determined entire medium stored in the toy, the corresponding playing content may be directly intercepted from the stored entire medium. Moreover, the characteristic playing content also may be directly stored in the toy. By adopting the way of directly storing the characteristic playing content, the consumption to a storage space of the toy may be reduced to some extent.

Herein, when the medium sample is collected, and/or playing content of the medium being played is collected, different ways may be selected according to a specific requirement. For example, the medium sample may be collected, and/or the playing content of the medium being played may be collected in a way of voice recording and image recording on the medium or photographing on the medium.

According to an example of the embodiment, when according to the predicted to-be-played content the toy is driven, at the corresponding time point after the predetermined time period, to synchronously execute the interactive content corresponding to the to-be-played content, many ways also may be adopted according to different interactive contents. Examples are illustrated as follows.

For example, in a condition in which a scene corresponding to the predicted to-be-played content includes an obvious illumination change effect, a lamp of the toy is driven at the corresponding time point after the predetermined time period to generate an illumination change occurred in the scene, thereby rendering a real scene of the to-be-played content. In short, the lamplight effect of the scene of the to-be-played content is displayed by means of lamp flickering.

For another example, in a condition in which a scene corresponding to the predicted to-be-played content includes a voice having an obvious voice characteristic, a loudspeaker of the toy is driven at the corresponding time point after the predetermined time period to play the voice occurred in the scene, thereby simulating a voice atmosphere of the to-be-played content. In short, the voice environment of the scene of the to-be-played content may be displayed by playing a voice frequency occurred in the to-be-played content.

For the other example, in a condition in which a scene corresponding to the predicted to-be-played content includes a characteristic action, a motor of the toy is driven at the corresponding time point after the predetermined time period to display the characteristic action occurred in the scene, thereby providing the toy user to simulate or implementing an interaction with a toy user. In short, the action in the to-be-played content may be displayed by means of driving the toy to simulate the action occurred in the to-be-played content.

It is to be noted that, when the toy is driven, according to the predicted to-be-played content, at the corresponding time point after the predetermined time period to synchronously execute the interactive content corresponding to the to-be-played content, the corresponding interactive content also may be selected according to a specific scene. For example, when there is a need for the toy to display the to-be-played content, the toy may be driven at the corresponding time point after the predetermined time period to synchronously execute an interactive content same as the to-be-played content, wherein the interactive content same as the to-be-played content includes: an interactive content completely or partially same as the to-be-played content; and/or when there is a need for the toy to respond to the to-be-played content, the toy is driven at the corresponding time point after the predetermined time period to synchronously execute an interactive content for responding the to-be-played content, wherein the interactive content for responding the to-be-played content includes at least one of the followings: a response action for answering a question proposed in the to-be-played content, a response action for asking a question corresponding to an answer included in the to-be-played content and a response action for responding an action included in the to-be-played content. For example, if the to-be-played content is an interesting question and answer, when the interesting question is played at the corresponding time point after the predetermined time period, the toy gives the answer for the interesting question. If the to-be-played content includes the answer for some question, the question may be played when the toy gives the answer, thereby implementing a scene in which the medium replies the question of the toy.

It is to be noted that, for different collected medium samples or playing contents, the characteristic information of the different collected medium samples or playing contents are also different. For example, in a condition in which the collected medium sample or the playing content is the voice, the characteristic information of the collected medium sample or playing content may include at least one of the followings: frequency information of the voice; time sequence information of the voice; tone information of the voice; accent information of the voice; and type information of a medium included in the voice.

In a condition in which the collected medium sample or the playing content is an image, the characteristic information of the collected medium sample or playing content may include at least one of the followings: color information of the image; picture information of the image; definition information of the image; brightness information of the image; and pixel information of the image.

Figure 2:
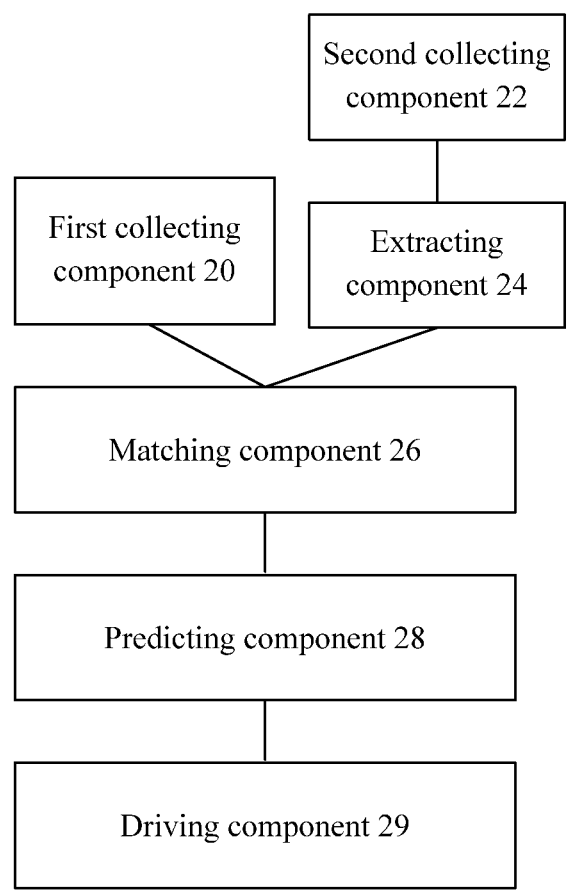
FIG. 2 is a structure diagram of a toy interactive device according to an embodiment of the present disclosure.

FIG. 2 is a structure diagram of a toy interactive device according to an embodiment of the present disclosure. As shown in FIG. 2, the device includes: a first collecting component 20, a second collecting component 22, an extracting component 24, a matching component 26, a predicting component 28 and a driving component 29. The device will be described hereinafter.

The first collecting component 20 is configured to collect a medium sample and generate reference sample information of the medium sample; the second collecting component 22 is configured to collect a playing content of a medium being played; the extracting component 24 is connected to the second collecting component 22 and is configured to extract characteristic information of the collected playing content; the matching component 26 is connected to the first collecting component 20 and the extracting component 24 and is configured to match the extracted characteristic information with the reference sample information to obtain a matching result; the predicting component 28 is connected to the matching component 26 and is configured to predict, according to the obtained matching result, a to-be-played content that is to be played after a predetermined time period in the medium being played; the driving component 29 is connected to the predicting component 28 and is configured to drive, according to the predicted to-be-played content, a toy at a corresponding time point after the predetermined time period to synchronously execute an interactive content corresponding to the to-be-played content.

Figure 3:
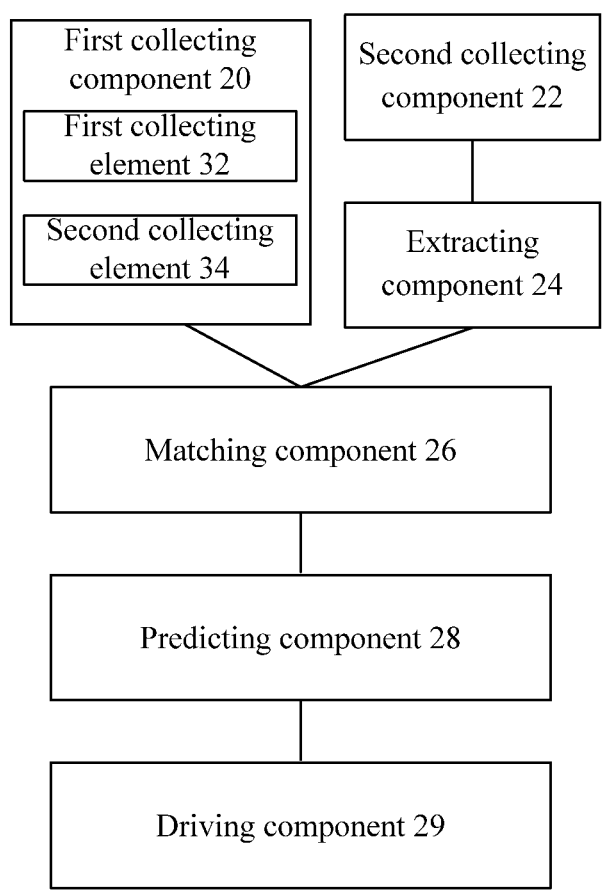
FIG. 3 is a preferred structure diagram of a first collecting component 20 in the toy interactive device according to an embodiment of the present disclosure.

FIG. 3 is a preferred structure diagram of a first collecting component 20 in the toy interactive device according to an embodiment of the present disclosure. As shown in FIG. 3, the first collecting component 20 includes a first collecting element 32 and/or a second collecting element 34. The first collecting component 20 will be described hereinafter.

The first collecting element 32 is configured to collect the medium sample matched to the toy before the toy leaves a factory, generate the reference sample information of the medium sample and store the reference sample information to the toy before the toy leaves the factory; the second collecting element 34 is configured to collect the medium sample and generate the reference sample information of the medium sample before a step that the playing content of the medium being played is collected in an interaction performed with the playing medium via the toy.

Figure 4:
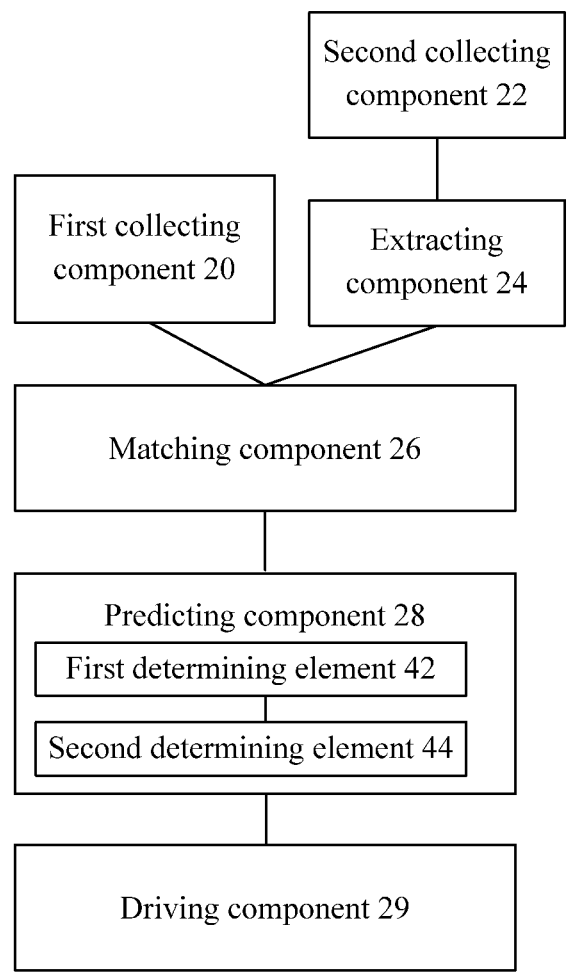
FIG. 4 is a preferred structure diagram of a predicting component 28 in the toy interactive device according to an embodiment of the present disclosure.

FIG. 4 is a preferred structure diagram of a predicting component 28 in the toy interactive device according to an embodiment of the present disclosure. As shown in FIG. 4, the predicting component 28 includes: a first determining element 42 and a second determining element 44. The predicting component 28 will be described hereinafter.

The first determining element 42 is configured to determine a characteristic playing content included in the medium in a condition in which the obtained matching result is that the characteristic information is matched with the reference sample information, wherein the characteristic playing content is a playing content predetermined for interaction; the characteristic playing content includes one of the followings: a playing content specified in the medium sample matched with the toy, a default playing content corresponding to a predetermined time point in the medium sample, and a playing content specified by means of receiving an instruction input by a toy user in the medium sample that is collected in the interaction performed with the playing medium via the toy.

The second determining element 44 is connected to the first determining element 42 and is configured to determine the characteristic playing content as the to-be-played content that is to be played after the predetermined time period.

According to an example embodiment, the first collecting component 20 is further configured to collect the medium sample in a manner of voice recording or image recording on the medium sample; and/or the second collecting component 22 is further configured to collect the playing content of the medium being played in the manner of the voice recording or the image recording on the medium sample.

Figure 5:
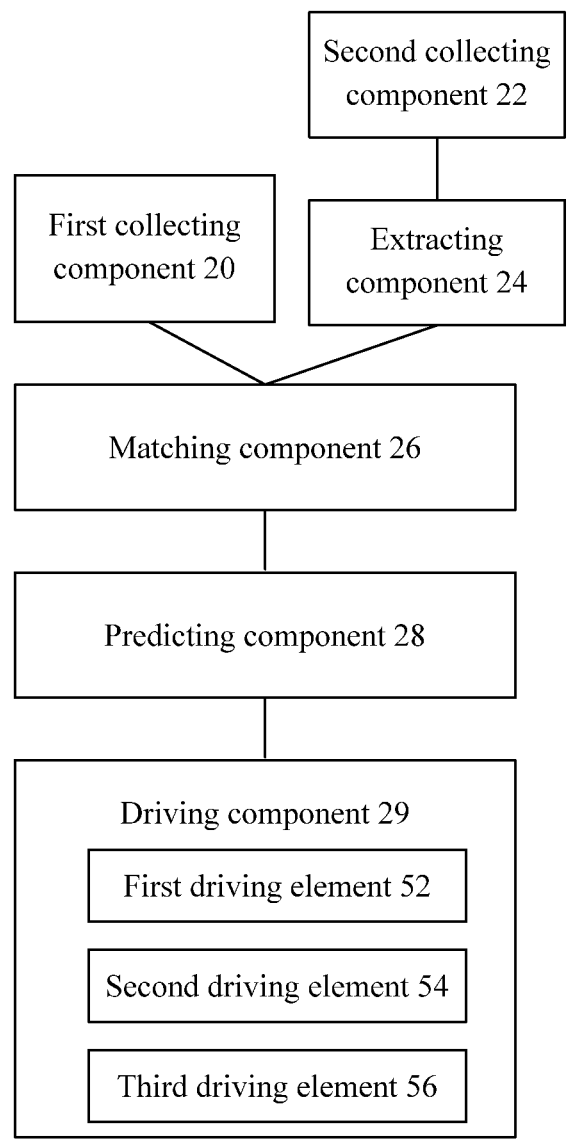
FIG. 5 is a first preferred structure diagram of a driving component 29 in the toy interactive device according to an embodiment of the present disclosure.

FIG. 5 is a first preferred structure diagram of a driving component 29 in the toy interactive device according to an embodiment of the present disclosure. As shown in FIG. 5, the driving component 29 includes at least one of the followings: a first driving element 52, a second driving element 54 and a third driving element 56. The preferable driving component 29 will be described hereinafter.

The first driving element 52 is configured in a condition in which a scene corresponding to the predicted to-be-played content includes an obvious illumination change effect, to drive a lamp of the toy at the corresponding time point after the predetermined time period to generate an illumination change occurred in the scene, thereby rendering a real scene of the to-be-played content.

The second driving element 54 is configured in a condition in which a scene corresponding to the predicted to-be-played content includes a voice having an obvious voice characteristic, to drive a loudspeaker of the toy at the corresponding time point after the predetermined time period to play the voice occurred in the scene, thereby simulating a voice atmosphere of the to-be-played content.

The third driving element 56 is configured in a condition in which a scene corresponding to the predicted to-be-played content includes a characteristic action, to drive a motor of the toy at the corresponding time point after the predetermined time period to display the characteristic action occurred in the scene, thereby providing the toy user to simulate or implementing the interaction with the toy user.

Figure 6:
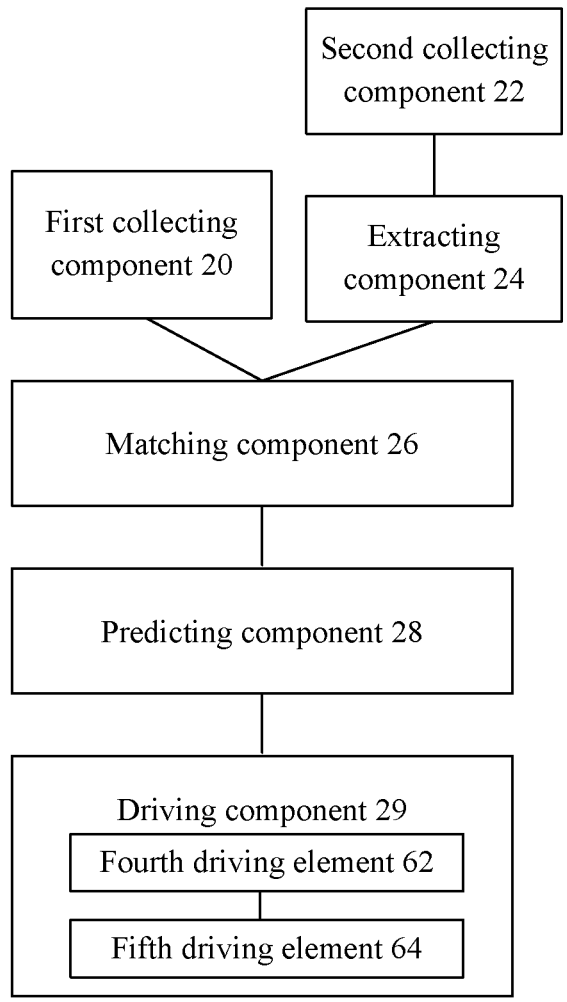
FIG. 6 is a second preferred structure diagram of a driving component 29 in the toy interactive device according to an embodiment of the present disclosure.

FIG. 6 is a second preferred structure diagram of a driving component 29 in the toy interactive device according to an embodiment of the present disclosure. As shown in FIG. 6, the driving component 29 includes: a fourth driving element 62 and/or a fifth driving element 64. The driving component 29 will be described hereinafter.

The fourth driving element 62 is configured to drive the toy at the corresponding time point after the predetermined time period to synchronously execute an interactive content same as the to-be-played content, wherein the interactive content same as the to-be-played content includes: an interactive content completely or partially the same as the to-be-played content; and/or the fifth driving element 64 is configured to drive the toy at the corresponding time point after the predetermined time period to synchronously execute an interactive content for responding the to-be-played content, wherein the interactive content for responding the to-be-played content includes at least one of the followings: a response action for answering a question proposed in the to-be-played content, a response action for asking a question corresponding to an answer included in the to-be-played content and a response action for responding an action included in the to-be-played content.

Figure 7:
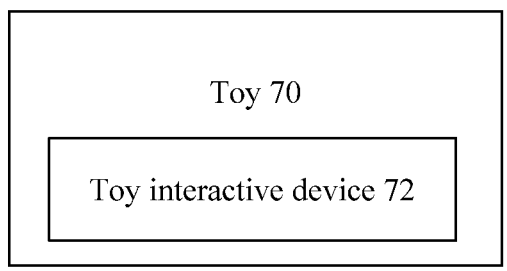
FIG. 7 is a structure diagram of a toy according to an embodiment of the present disclosure.

FIG. 7 is a structure diagram of a toy according to an embodiment of the present disclosure. As shown in FIG. 7, the toy 70 includes the above toy interactive device 72.

In the embodiments, a storage medium is further provided; the storage medium includes a stored program, wherein the program, when operated, controls a device where the storage medium is located to implement the above toy interactive method.

In the embodiments, a processor is further provided, which is characterized in that the processor is configured to operate a program, wherein the program implements the above toy interactive method when operated.

The preferred embodiments of the present disclosure will be described below based on a specific scene. Herein, the specific scene is a scene in which the medium content is a television program played by a television and the collected medium content is the voice.

In a preferred embodiment, the toy may be interactive with the television program played by the television. For example, the toy recognizes a certain segment of voice or music of a cartoon in the television to obtain program information and then judges an interactive action (such as applauding and singing) made by the toy after a certain period of time (such as 1s) according to a progress of the cartoon. And 1 s later, the toy will be interactive with the program to perform the applauding action.

By means of the toy, a child may know a content of the television program, a game and the like more truly, vividly and lively. And meanwhile, for an education cartoon, the fun of the child in learning may be increased more and thus the learning interest is improved. The preferred embodiments will be described hereinafter.

Figure 8:
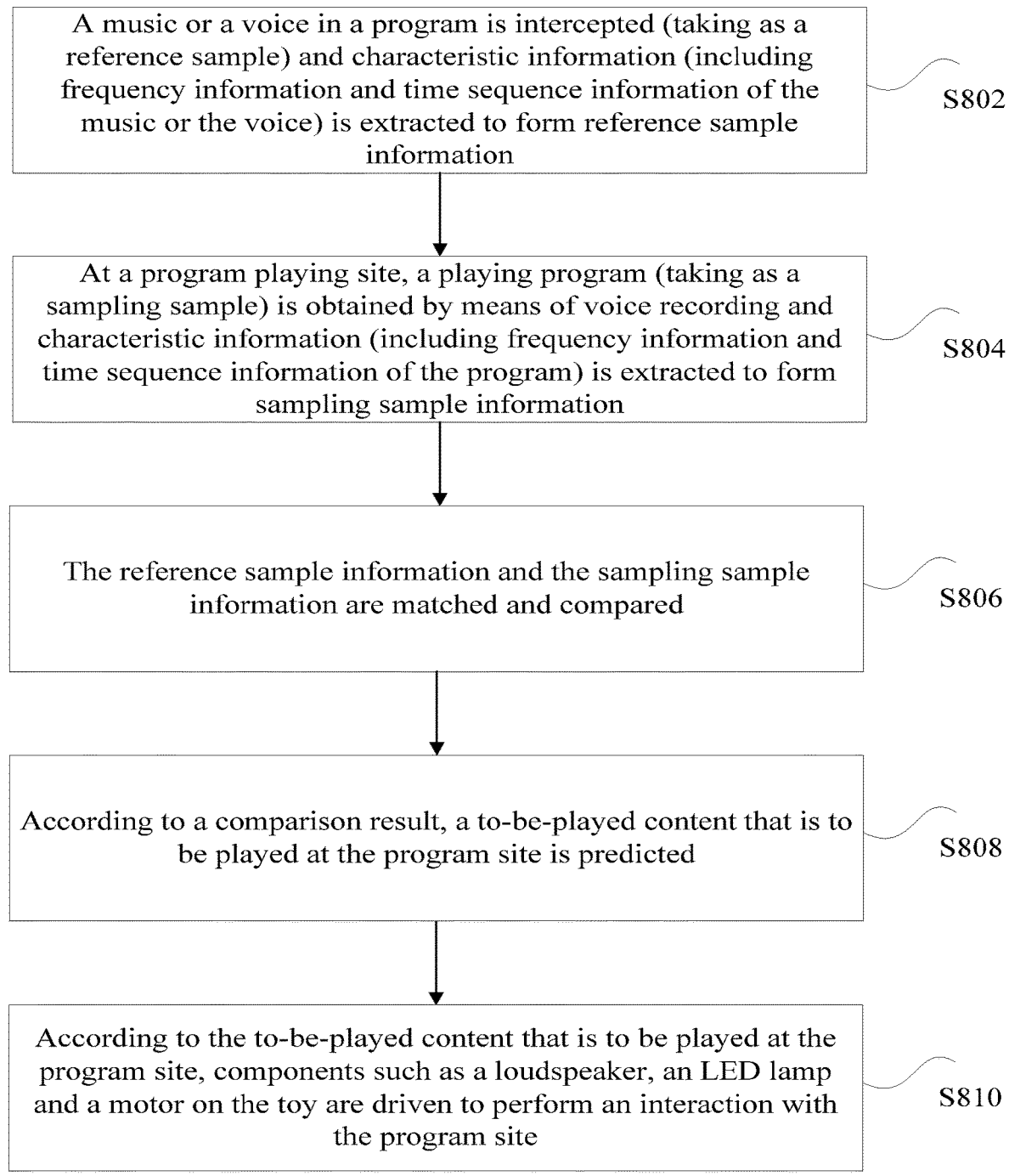
FIG. 8 is a flowchart of a toy interactive method according to a preferred embodiment of the present disclosure.

FIG. 8 is a flowchart of a toy interactive method according to a preferred embodiment of the present disclosure. As shown in FIG. 8, the flowchart includes the following steps.

In step S802, a music or a voice in a program is intercepted (taking as a reference sample) and characteristic information (including frequency information and time sequence information of the music or the voice) is extracted to form reference sample information.

In step S804, at a program playing site, a playing program (taking as a sampling sample) is obtained by means of voice recording and characteristic information including frequency information and time sequence information of the program is extracted to form sampling sample information.

In step S806, the reference sample information and the sampling sample information are matched and compared. It is to be noted that, there may be many ways for matching and comparing.

In step S808, according to a comparison result, a to-be-played content that is to be played at the program site is predicted.

In step S810, according to the to-be-played content that is to be played at the program site, components such as a loudspeaker, a Light-Emitting Diode (LED) lamp and a motor on the toy are driven to perform the interaction with the program site.

It is to be noted that, the reference sample stored in the toy may be a program matched with the program played at the program site (such as matched cartoon and game). After the reference sample information and the sampling sample information are matched and compared, the development of a story line of the matched program may be predicted to obtain the to-be-played content that is to be played. Thereafter, by means of an operation instruction corresponding to the interactive content, the toy is driven to perform the interaction. In the interaction with the program played at the program site, many ways such as a flashing lamp, a voice and an action may be selected for interaction.

Through the above preferred embodiment, the corresponding interaction is achieved by using the toy to recognize the program content played at the program site. Therefore, the user may implement the timely interaction with various programs (video programs such as a cartoon, a film and television program, and a game) via the toy, being more real and vivid.

Figure 9:
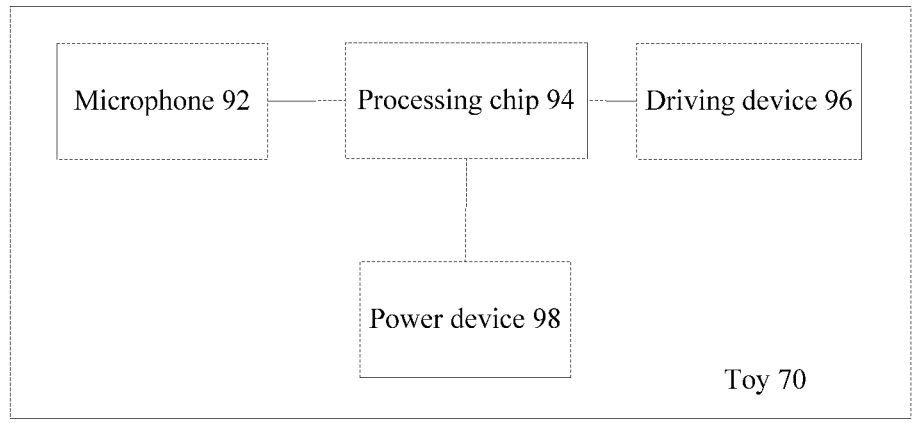
FIG. 9 is a structure diagram of a toy according to a preferred embodiment of the present disclosure.

FIG. 9 is a structure diagram of a toy according to a preferred embodiment of the present disclosure. As shown in FIG. 9, the toy 70 in the preferred embodiment includes: a microphone 92, a processing chip 94, a driving device 96 and a power device 98. The toy in the preferred embodiment will be described hereinafter.

The microphone 92 is configured to collect a television program being played and has a same function with the above second collecting component 22. The processing chip 94 is connected with the microphone 92, is configured to recognize characteristic information of the collected television program, match the recognized characteristic information with sampling sample information stored in advance, and predict a to-be-played content that is to be played at a program site according to a matching result, and has a same function with the above extracting component 24 and the predicting component 28. The driving component 96 is connected with the processing chip 94 and is configured to drive components such as a loudspeaker, an LED lamp and a motor on the toy to perform the interaction with the program site. The power device 98 is connected with the processing chip 94 and is configured to provide a power supply for the toy.

Figure 10:
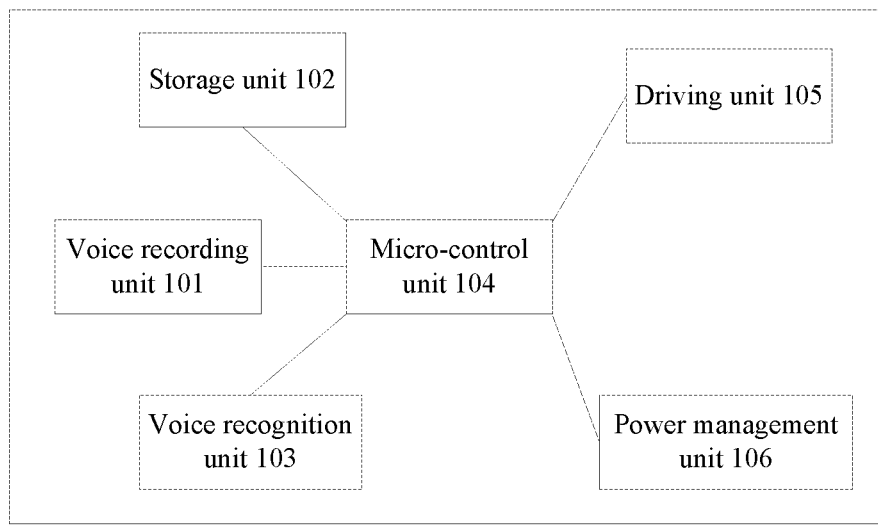
FIG. 10 is a structure diagram of a processing chip 94 in the toy according to a preferred embodiment of the present disclosure.

FIG. 10 is a structure diagram of a processing chip 94 in the toy according to a preferred embodiment of the present disclosure. As shown in FIG. 10, the processing chip 94 of the toy in the preferred embodiment includes: a voice recording unit 101, a storage unit 102, a voice recognition unit 103, a micro-control unit 104, a driving unit 105 and a power management unit 106. The structure of the processing chip will be described hereinafter.

The voice recording unit 101 is configured to perform voice recording on each possibly played television program. The storage unit 102 is configured to store the television program recorded by the voice recording unit 101. The voice recognition unit 103 is configured to recognize the collected site voice. The micro-control unit 104 is configured to control logic of each unit included in the processing chip 94. The driving unit 105 is configured to drive components such as a loudspeaker, an LED lamp and a motor on the toy to perform the interaction with the site according to a control instruction sent by the micro-control unit 104. The power management unit 106 is configured to perform control management on the power device 98 on the toy.

Figure 11:
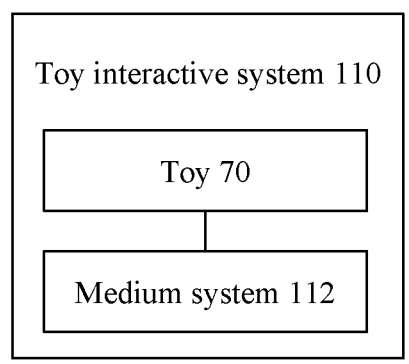
FIG. 11 is a structure diagram of a toy interactive system according to a preferred embodiment of the present disclosure.

FIG. 11 is a structure diagram of a toy interactive system according to a preferred embodiment of the present disclosure. As shown in FIG. 11, the toy interactive system 110 in the preferred embodiment includes the toy 70 and a medium device 112 for playing a program.

The sequence numbers of the embodiments of the present disclosure described above are merely for description, which do not represent merits or defects of the embodiments.

In the embodiments of the present disclosure, the emphasis on the description of each of the embodiments is different. For any part not described in detail in some embodiment, it may be referred to related description in other embodiments.

In the several embodiments provided in the present disclosure, it should be understood that the technical content disclosed can be implemented in other ways. The device embodiments described above are merely exemplary, for example, the classification of the units is merely a classification of logic functions, and in practice implementations, there are other classification ways. For example, some of the units or components may be combined or integrated into other system, or some characteristics may be omitted or unexecuted. Moreover, coupling or direct coupling or communication connection between the components illustrated or discussed herein may be indirect coupling or communication connection of devices or units by some interfaces or may be electric connection, mechanical connection or the other forms of connection.

The units described as separate components may be or may be not physically separated, and the components illustrated as units may be or may be not physical units, i.e., they may be located at one place or distributed in a plurality of network units. Moreover, some of or all the units may be selected according to actual demands to implement the purpose of the embodiments of the present disclosure.

In addition, the functional units involved in the embodiments of the present disclosure may be all integrated into a processing unit or each of the units may be act as a unit separately, or two or more than two of these units may be integrated into one unit; the integrated unit described above may be implemented in the form of hardware or may be implemented in the form of hardware plus software function units.

If being implemented in form of a software function module and sold or used as an independent product, the integrated units of the present disclosure may be stored in a computer-readable storage medium. Based on such an understanding, the technical solutions of the embodiment of the present disclosure substantially or a part with contributions to the conventional art may be embodied in form of software product, and the computer software product is stored in a storage medium, including a plurality of instructions arranged to enable a computer (which may be a personal computer, a server, a network device or the like) to execute all or part of the method in each embodiment of the present disclosure. The preceding storage medium includes: various media capable of storing program codes such as a U disk, a Read-Only Memory (ROM), a Random Access Memory (RAM), a mobile hard disk, a magnetic disk or a compact disc.

The above description is only preferred embodiments of the present disclosure. It should be noted that those of ordinary skill in the art may make various changes and modifications without departing from the principle of the present disclosure. All these changes and modifications also should be included in the protection scope of the present disclosure.

What is claimed is:

1. A toy interactive method, comprising:
    collecting a medium sample and generating reference sample information of the medium sample;
    collecting a playing content of a medium being played, wherein collecting the playing content of the medium being played comprises: collecting the playing content of the medium being played in a manner of voice recording or image recording on the playing content;
    extracting characteristic information of the collected playing content;
    matching the extracted characteristic information with the reference sample information to obtain a matching result;
    predicting, according to the obtained matching result, a to-be-played content that is to be played after a predetermined time period in the medium being played; and
    driving, according to the predicted to-be-played content, a toy at a corresponding time point after the predetermined time period to synchronously execute an interactive content corresponding to the to-be-played content.

2. The method as claimed in claim 1, wherein collecting the medium sample and generating the reference sample information of the medium sample comprises:
    collecting the medium sample matched to the toy before the toy leaves a factory, generating the reference sample information of the medium sample and storing the generated reference sample information to the toy before the toy leaves the factory;
    and/or
    in an interaction performed with the playing medium via the toy, before a step of collecting the playing content of the medium being played, collecting the medium sample and generating the reference sample information of the medium sample.

3. The method as claimed in claim 1, wherein predicting, according to the obtained matching result, the to-be-played content that is to be played after the predetermined time period in the medium being played comprises:
    in a condition in which the obtained matching result is that the characteristic information is matched with the reference sample information, determining a characteristic playing content comprised in the medium, wherein the characteristic playing content is a playing content predetermined for interaction; the characteristic playing content comprises one of followings: a playing content specified in the medium sample matched with the toy, a default playing content corresponding to a predetermined time point in the medium sample, and a playing content specified by means of receiving an instruction input by a toy user in the medium sample that is collected in an interaction performed with the playing medium via the toy; and
    determining the characteristic playing content as the to-be-played content that is to be played after the predetermined time period.

4. The method as claimed in claim 1, wherein collecting the medium sample comprises:
    collecting the medium sample in a manner of voice recording or image recording on the medium sample.

5. The method as claimed in claim 1, wherein driving, according to the predicted to-be-played content, the toy at the corresponding time point after the predetermined time period to synchronously execute the interactive content corresponding to the to-be-played content comprises at least one of followings:

in a condition in which a scene corresponding to the predicted to-be-played content comprises an obvious illumination change effect, driving a lamp of the toy at the corresponding time point after the predetermined time period to generate an illumination change occurred in the scene, thereby rendering a real scene of the to-be-played content;

in a condition in which a scene corresponding to the predicted to-be-played content comprises a voice having an obvious voice characteristic, driving a loudspeaker of the toy at the corresponding time point after the predetermined time period to play the voice occurred in the scene, thereby simulating a voice atmosphere of the to-be-played content; and in a condition in which a scene corresponding to the predicted to-be-played content comprises a characteristic action, driving a motor of the toy at the corresponding time point after the predetermined time period to display the characteristic action occurred in the scene, thereby providing a toy user to simulate or implementing an interaction with a toy user.

6. The method as claimed in claim 1, wherein driving, according to the predicted to-be-played content, the toy at the corresponding time point after the predetermined time period to synchronously execute the interactive content corresponding to the to-be-played content comprises:

driving the toy at the corresponding time point after the predetermined time period to synchronously execute an interactive content same as the to-be-played content, wherein the interactive content same as the to-be-played content comprises: an interactive content completely or partially same as the to-be-played content;

and/or driving the toy at the corresponding time point after the predetermined time period to synchronously execute an interactive content for responding the to-be-played content, wherein the interactive content for responding the to-be-played content comprises at least one of followings: a response action for answering a question proposed in the to-be-played content, a response action for asking a question corresponding to an answer comprised in the to-be-played content and a response action for responding an action comprised in the to-be-played content.

7. The method as claimed in claim 1, wherein in a condition in which the collected medium sample or the playing content is a voice, the characteristic information or the reference sample information comprises at least one of followings:

frequency information of the voice; time sequence information of the voice; tone information of the voice; accent information of the voice; and type information of a medium comprised in the voice.

8. The method as claimed in claim 1, wherein in a condition in which the collected medium sample or the playing content is an image, the characteristic information or the reference sample information comprises at least one of followings:

color information of the image; picture information of the image; definition information of the image; brightness information of the image; and pixel information of the image.

9. A toy interactive device, comprising:

a first collecting component, configured to collect a medium sample and generate reference sample information of the medium sample;

a second collecting component, configured to collect a playing content of a medium being played, wherein the second collecting component is further configured to collect the playing content of the medium being played in a manner of voice recording or image recording on the playing content;

an extracting component, configured to extract characteristic information of the collected playing content;

a matching component, configured to match the extracted characteristic information with the reference sample information to obtain a matching result;

a predicting component, configured to predict, according to the obtained matching result, a to-be-played content that is to be played after a predetermined time period in the medium being played; and a driving component, configured to drive, according to the predicted to-be-played content, a toy at a corresponding time point after the predetermined time period to synchronously execute an interactive content corresponding to the to-be-played content.

10. The device as claimed in claim 9, wherein the first collecting component comprises:

a first collecting element, configured to collect the medium sample matched to the toy before the toy leaves a factory, generate the reference sample information of the medium sample and store the generated reference sample information to the toy before the toy leaves the factory;

and/or a second collecting element, configured to collect the medium sample and generate the reference sample information of the medium sample before a step of collecting the playing content of the medium being played in an interaction performed with the playing medium via the toy.

11. The device as claimed in claim 10, wherein the predicting component comprises:

a first determining element, configured to determine a characteristic playing content comprised in the medium in a condition in which the obtained matching result is that the characteristic information is matched with the reference sample information, wherein the characteristic playing content is a playing content predetermined for interaction; the characteristic playing content comprises one of followings: a playing content specified in the medium sample matched with the toy, a default playing content corresponding to a predetermined time point in the medium sample, and a playing content specified by means of receiving an instruction input by a toy user in the medium sample that is collected in an interaction performed with the playing medium via the toy; and a second determining element, configured to determine the characteristic playing content as the to-be-played content that is to be played after the predetermined time period.

12. The device as claimed in claim 9, wherein the first collecting component is further configured to collect the medium sample in a manner of voice recording or image recording on the medium sample.

13. The device as claimed in claim 9, wherein the driving component comprises at least one of followings:

a first driving element, configured in a condition in which a scene corresponding to the predicted to-be-played content comprises an obvious illumination change effect, to drive a lamp of the toy at the corresponding time point after the predetermined time period to generate an illumination change occurred in the scene, thereby rendering a real scene of the to-be-played content;

a second driving element, configured in a condition in which a scene corresponding to the predicted to-be-played content comprises a voice having an obvious voice characteristic, to drive a loudspeaker of the toy at the corresponding time point after the predetermined time period to play the voice occurred in the scene, thereby simulating a voice atmosphere of the to-be-played content; and a third driving element, configured in a condition in which a scene corresponding to the predicted to-be-played content comprises a characteristic action, to drive a motor of the toy at the corresponding time point after the predetermined time period to display the characteristic action occurred in the scene, thereby providing a toy user to simulate or implementing an interaction with a toy user.

14. The device as claimed in claim 9, wherein the driving component comprises:

a fourth driving element, configured to drive the toy at the corresponding time point after the predetermined time period to synchronously execute an interactive content same as the to-be-played content, wherein the interactive content same as the to-be-played content comprises: an interactive content completely or partially same as the to-be-played content;

and/or a fifth driving element, configured to drive the toy at the corresponding time point after the predetermined time period to synchronously execute an interactive content for responding the to-be-played content, wherein the interactive content for responding the to-be-played content comprises at least one of followings: a response action for answering a question proposed in the to-be-played content, a response action for asking a question corresponding to an answer comprised in the to-be-played content and a response action for responding an action comprised in the to-be-played content.

15. A toy, comprising the toy interactive device as claimed in claim 9.

16. The method as claimed in claim 2, wherein driving, according to the predicted to-be-played content, the toy at the corresponding time point after the predetermined time period to synchronously execute the interactive content corresponding to the to-be-played content comprises:

driving the toy at the corresponding time point after the predetermined time period to synchronously execute an interactive content same as the to-be-played content, wherein the interactive content same as the to-be-played content comprises: an interactive content completely or partially same as the to-be-played content;

and/or driving the toy at the corresponding time point after the predetermined time period to synchronously execute an interactive content for responding the to-be-played content, wherein the interactive content for responding the to-be-played content comprises at least one of followings: a response action for answering a question proposed in the to-be-played content, a response action for asking a question corresponding to an answer comprised in the to-be-played content and a response action for responding an action comprised in the to-be-played content.

17. The method as claimed in claim 3, wherein driving, according to the predicted to-be-played content, the toy at the corresponding time point after the predetermined time period to synchronously execute the interactive content corresponding to the to-be-played content comprises:

driving the toy at the corresponding time point after the predetermined time period to synchronously execute an interactive content same as the to-be-played content, wherein the interactive content same as the to-be-played content comprises: an interactive content completely or partially same as the to-be-played content;

and/or driving the toy at the corresponding time point after the predetermined time period to synchronously execute an interactive content for responding the to-be-played content, wherein the interactive content for responding the to-be-played content comprises at least one of followings: a response action for answering a question proposed in the to-be-played content, a response action for asking a question corresponding to an answer comprised in the to-be-played content and a response action for responding an action comprised in the to-be-played content.

18. The method as claimed in claim 4, wherein driving, according to the predicted to-be-played content, the toy at the corresponding time point after the predetermined time period to synchronously execute the interactive content corresponding to the to-be-played content comprises:

driving the toy at the corresponding time point after the predetermined time period to synchronously execute an interactive content same as the to-be-played content, wherein the interactive content same as the to-be-played content comprises: an interactive content completely or partially same as the to-be-played content;

and/or driving the toy at the corresponding time point after the predetermined time period to synchronously execute an interactive content for responding the to-be-played content, wherein the interactive content for responding the to-be-played content comprises at least one of followings: a response action for answering a question proposed in the to-be-played content, a response action for asking a question corresponding to an answer comprised in the to-be-played content and a response action for responding an action comprised in the to-be-played content.

19. The method as claimed in claim 5, wherein driving, according to the predicted to-be-played content, the toy at the corresponding time point after the predetermined time period to synchronously execute the interactive content corresponding to the to-be-played content comprises:

driving the toy at the corresponding time point after the predetermined time period to synchronously execute an interactive content same as the to-be-played content, wherein the interactive content same as the to-be-played content comprises: an interactive content completely or partially same as the to-be-played content;

and/or driving the toy at the corresponding time point after the predetermined time period to synchronously execute an interactive content for responding the to-be-played content, wherein the interactive content for responding the to-be-played content comprises at least one of followings: a response action for answering a question proposed in the to-be-played content, a response action for asking a question corresponding to an answer comprised in the to-be-played content and a response action for responding an action comprised in the to-be-played content.

20. The method as claimed in claim 2, wherein in a condition in which the collected medium sample or the playing content is a voice, the characteristic information or the reference sample information comprises at least one of followings:

frequency information of the voice; time sequence information of the voice; tone information of the voice; accent information of the voice; and type information of a medium comprised in the voice.

* * * * *